F. WOLF.
Refrigerator.
No. 220,459.  Patented Oct. 7, 1879.
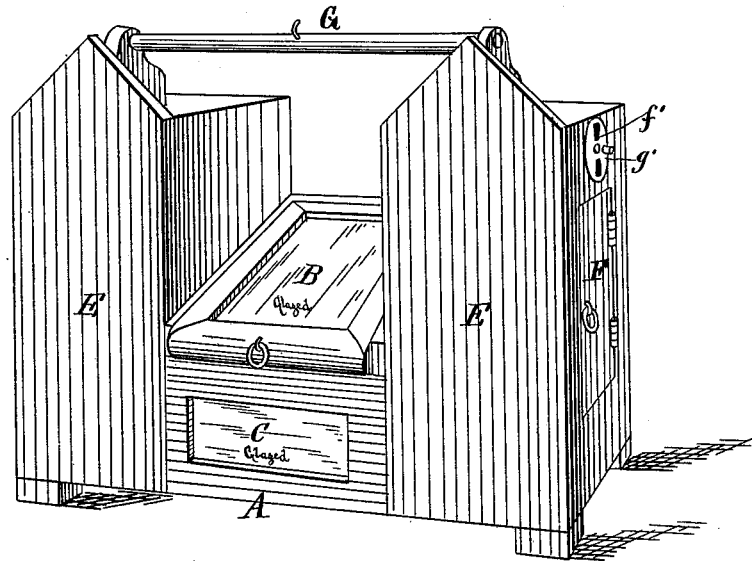
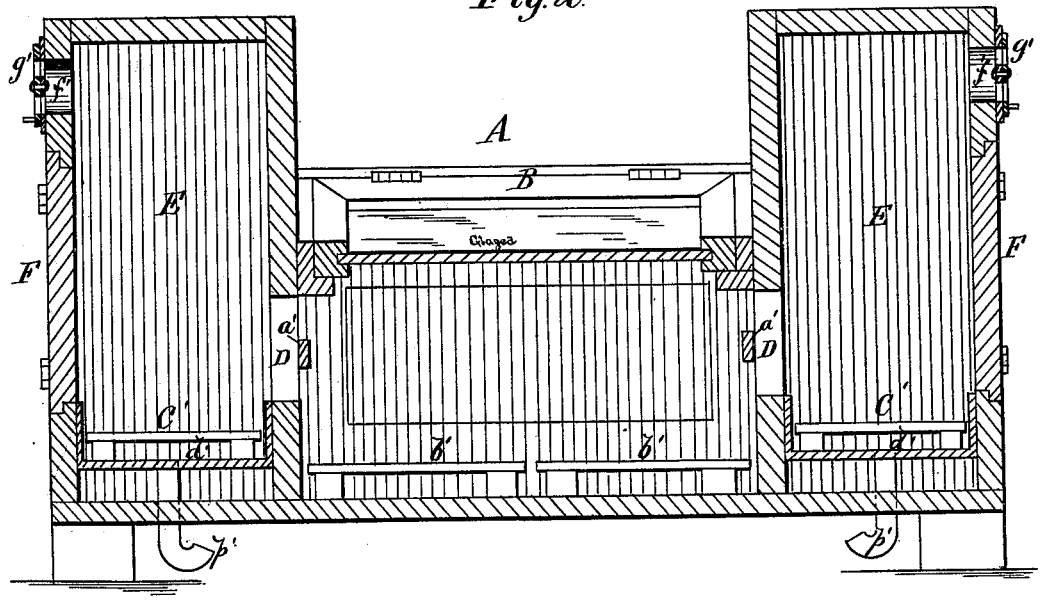
WITNESSES:
Henry N. Miller
C. Sedgwick
INVENTOR:
F. Wolf
BY Munn & Co
ATTORNEYS.

UNITED STATES PATENT OFFICE.

FREDERIC WOLF, OF QUINCY, ILLINOIS.

IMPROVEMENT IN REFRIGERATORS.

Specification forming part of Letters Patent No. 220,459, dated October 7, 1879; application filed June 17, 1879.

*To all whom it may concern:*

Be it known that I, FREDERIC WOLF, of Quincy, in the county of Adams and State of Illinois, have invented a new and Improved Refrigerator, of which the following is a specification.

Figure 1 is a perspective elevation of the device. Fig. 2 is a vertical sectional elevation.

Similar letters of reference indicate corresponding parts.

The object of this invention is to furnish a simple and effective refrigerator for cooling and preserving meats, &c.

The invention consists, essentially, of a wooden refrigerating-box, with a glazed cover and front, fixed between two higher ice-boxes that open into it, so that the cold air from them shall descend into it.

In the drawings, A represents the box or chamber for containing the meats, &c., to be cooled and preserved, provided with a hinged glazed cover, B, preferably sloping, and a glazed front opening, C, and the two like side openings, D D, into the adjoining ice-chambers, which openings have a bar, $a'$, across them to prevent the ice from the ice-chambers from falling into the meat-chamber.

The meat, &c., can be suspended in this chamber, or placed upon the gratings or shelves $b'$, with which it is furnished.

E E are the ice boxes or chambers, of twice the height, or thereabout, of the meat-chamber.

The ice is put into them through the doors F F, and placed on the gratings $c'$, that are set above the drip-pans $d'$, which pans are furnished with waste-pipes $p'$ to carry off the ice-water, and which are bent at the lower ends to form trays for the prevention of an ingress of warm or egress of cold air.

Fresh air is admitted into the device through the openings $f'$ $f'$ in the upper part of the ice-boxes, that are furnished with registers $g'$ to regulate its admission. As the air passes over the ice it becomes cooled, and, seeking a lower level, flows through the openings D into the meat-chamber, and the currents entering from opposite directions create a circulation of air therein, that produces and maintains a constant cold temperature, thereby preserving meat, &c., far better than is done when the cold air is supplied from one reservoir.

The meat-chamber may be furnished with one or more covers or doors that open upward to prevent the least escape of cold air, while they may permit sufficient ventilation to allow the escape of vitiated air.

The glazed cover and front of the ice-box permit a ready inspection of the contents of the box without opening it, and thereby admitting warm air, flies, &c. Hence the contents of the box retain their natural freshness for a longer time, and less ice is consumed than in refrigerators of the ordinary design.

The ice boxes or chambers E E may be placed at the opposite ends of the meat-chamber A, as shown, or they may be placed at the opposite ends and in the rear of the meat-chamber, giving thereby a greater frontage to the latter; or they may be hidden from view by being placed in an adjoining room, through a wall of which suitable openings will connect them with the meat-chamber.

This device is especially adapted to the use of butchers, restaurants, grocers, &c., as it gives both customer and proprietor a quick oversight of the contents without disturbing them.

The ice-boxes may be made with double walls, and packed with some non-conducting material, and the interior of the chamber A may be lined with zinc or other substance.

When opened the cover B may be conveniently held open by hooking it to the cross-bar G, that extends from one ice box to the other.

Having thus described my invention, I claim as new and desire to secure by Letters Patent—

The within-described device for cooling and preserving meats, &c., consisting of the chamber A, provided with a sloping hinged and glazed cover, B, glazed front C, and grating or shelves $b'$, in combination with two higher ice-boxes, E, that are provided with doors F, openings $f'$, registers $g'$, gratings $c'$, drip-pans $d'$, drain-pipes $p'$, and openings D, across which are bars $a'$, constructed and arranged substantially as herein shown and described.

FREDERIC WOLF.

Witnesses:
F. W. MEYER,
WM. STEINWEDELL.